US008300015B2

(12) United States Patent
Mellot

(10) Patent No.: US 8,300,015 B2
(45) Date of Patent: Oct. 30, 2012

(54) METHOD OF DETECTING THE MOVEMENT OF AN ENTITY EQUIPPED WITH AN IMAGE SENSOR AND DEVICE FOR IMPLEMENTING SAME

(75) Inventor: Pascal Mellot, Lans en Vercors (FR)

(73) Assignee: STMicroelectronics S.A., Montrouge (FR)

(*) Notice: Subject to any disclaimer, the term of this patent is extended or adjusted under 35 U.S.C. 154(b) by 901 days.

(21) Appl. No.: 11/480,263

(22) Filed: Jun. 30, 2006

(65) Prior Publication Data
US 2007/0040805 A1 Feb. 22, 2007

(30) Foreign Application Priority Data

Jul. 5, 2005 (FR) .................................. 05 07169

(51) Int. Cl.
G06F 3/033 (2006.01)
G09G 5/08 (2006.01)
G09G 5/00 (2006.01)

(52) U.S. Cl. ........ 345/166; 345/156; 345/157; 345/163; 345/165

(58) Field of Classification Search .................. 345/156, 345/157, 163, 165, 166; 710/62–73; 715/856–862
See application file for complete search history.

(56) References Cited

U.S. PATENT DOCUMENTS

| | | | | |
|---|---|---|---|---|
| 4,371,895 A | * | 2/1983 | Koga | 375/240.14 |
| 5,173,772 A | * | 12/1992 | Choi | 375/240.16 |
| 5,644,139 A | * | 7/1997 | Allen et al. | 250/557 |
| 6,256,016 B1 | | 7/2001 | Piot et al. | |
| 7,057,148 B2 | * | 6/2006 | Wang | 250/208.1 |
| 2004/0100444 A1 | | 5/2004 | Park et al. | |
| 2005/0053137 A1 | | 3/2005 | Holcomb | 375/240.16 |
| 2006/0062305 A1 | | 3/2006 | Lu et al. | 375/240.16 |
| 2006/0222075 A1 | | 10/2006 | Zhang et al. | 375/240.16 |
| 2007/0019733 A1 | | 1/2007 | Mellot | |
| 2007/0160144 A1 | | 7/2007 | Lu et al. | 375/240.16 |

FOREIGN PATENT DOCUMENTS

| | | |
|---|---|---|
| EP | 1283493 A2 | 2/2003 |
| EP | 1361541 A1 | 11/2003 |

OTHER PUBLICATIONS

Jianhua Lu & Ming L. Liou, "A Simple and Efficient Search Algorithm for Block-Matching Motion Estimation", Apr. 1997, IEEE, vol. 7 No. 2, p. 429-433.*
Liu et al., "Complexity Comparison of Fast Block-Matching Motion Estimation Algorithms," IEEE, ICASSP 2004, Sep. 2004, pp. 341-344.
Rovati et al., "Spatial-Temporal Motion Estimation for Image Reconstruction and Mouse Functionality with Optical or Capacitive Sensors," IEEE Transactions on Consumer Electronics, 49(3):711-718, Aug. 2003.

* cited by examiner

Primary Examiner — Sumati Lefkowitz
Assistant Examiner — David Tung
(74) Attorney, Agent, or Firm — Seed IP Law Group PLLC

(57) ABSTRACT

In relation to a current image from a sequence of images captured by an image sensor, in a first step, a temporary motion vector is determined as a function of reference data comprising a preceding image and a motion vector associated to the preceding image. Then, in a second step, if the temporary motion vector does not satisfy a reliability criterion, the first step is repeated in relation to a following image, on the basis of the same reference data. Otherwise, the temporary motion vector is associated with the current image.

41 Claims, 5 Drawing Sheets

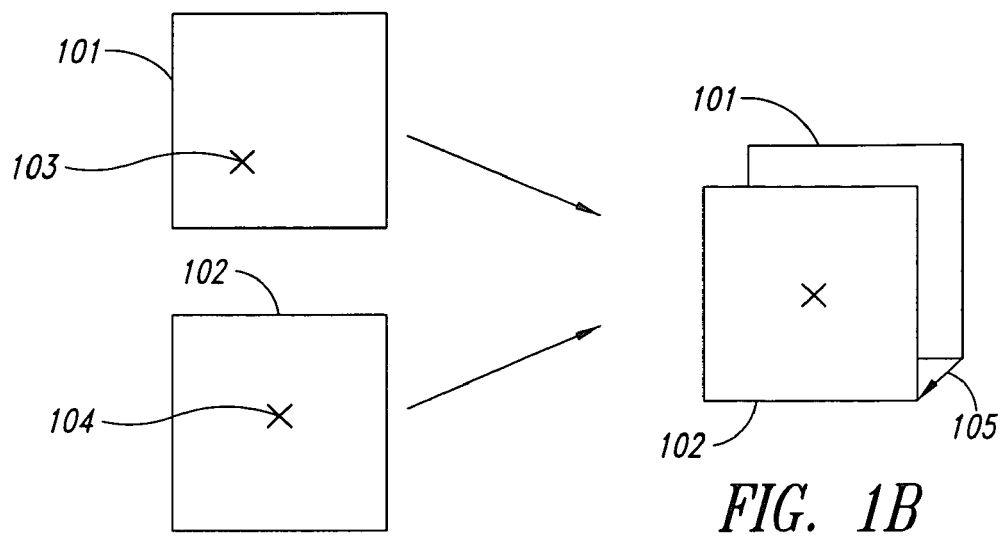
FIG. 1A
FIG. 1B
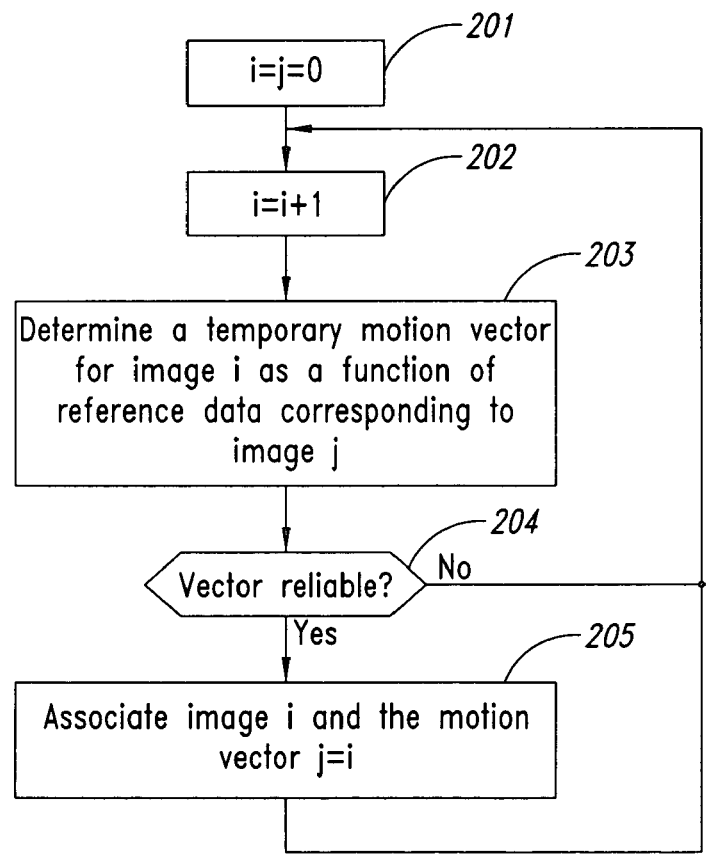
FIG. 2

METHOD OF DETECTING THE MOVEMENT OF AN ENTITY EQUIPPED WITH AN IMAGE SENSOR AND DEVICE FOR IMPLEMENTING SAME

BACKGROUND OF THE INVENTION

1. Field of the Invention

The present disclosure relates to the motion estimation methods designed for processing a sequence of images delivered, directly or indirectly, by a moving image sensor, in order to for example detect the motion of an entity equipped with this image sensor.

Accordingly, an embodiment of the present invention is particularly suitable for an optical mouse connected to a computer in information technology systems.

2. Description of the Related Art

Image processing techniques may, for example, detect movements of a mouse in order to re-transcribe them as cursor movements onto a computer screen. The movement of the optical mouse is generally detected on the basis of information acquired by a video sensor or another type of sensor which is mounted onto the optical mouse.

Such sensors deliver a digital signal in the form of a sequence of images acquired during the motion of the mouse. This digital signal is then processed in order to deduce the motion of the mouse from it.

Generally speaking, the mouse is moved over a suitable surface and the video sensor mounted on the mouse captures images of this surface during its movement. The movement of the mouse can then be reconstructed using the relative positions of objects within the successive captured images. Thus, starting from this movement, the movement that may be assigned to the cursor representing the movement of the mouse on the computer screen is deduced.

Some image processing operations of this type turn out to be complex. Indeed, they may require powerful calculations and consequently be costly in terms of time and/or calculation capacity, and in terms of power consumption which also poses problems of heat dissipation.

In order to facilitate the display of the optical mouse cursor, a motion estimation method is advantageously applied.

Such a method facilitates the movement of a block of pixels between two consecutive images to be estimated.

Certain methods of this type are used in another technical field which is that of video stream compression. Notably, a method described in the document 'Complexity Comparison of fast block-matching estimation algorithms', by Yilong Liu and Soontorn Oraintara, is known.

In the field of motion detection of an entity, these methods are based on an association of a motion vector with each of the images processed. Such a vector has a vertical component and horizontal component. It represents the movement of the mouse from one image to the next.

Thus, in such a context, the motion of the pixels of an image to be processed can be represented by a single motion vector.

This type of device may be subject to specific technical constraints, such as notably a time constraint. In this respect, the processing of such images is preferably performed within a very short time frame in order that the movement of the mouse be re-transcribed onto the screen of the computer in a manner that is virtually instantaneous for the user. Another very important constraint of this type of device is the production cost.

FIGS. 1A and 1B illustrate one definition of a motion vector. In FIG. 1A, a sequence of two images is shown: a first image 101 is followed by a second image 102. The detection of the mouse movement is based on the relative position of certain reference points comprised within the various captured images. The image 101 comprises a reference point in position 103 and the image 102 comprises the same reference point in position 104. Thus, the movement of the optical mouse is deduced using its position relative to this reference point.

In FIG. 1-B, the images 101 and 102 are overlaid such that the respective positions of the reference point coincide. The motion vector corresponding to the movement of the mouse in this context is represented by the arrow 105. Its components in the horizontal and vertical directions are named X and Y. Thus, the movement of the mouse between the image 101 and the image 102 can be represented in the following by the motion vector 105. The motion vector 105 can thus be associated with the image 101 allowing the position of the mouse within the following image 102 to be located.

The estimation of the associated motion of the mouse within a current image, in other words an image being processed, is generally based on motion vectors previously associated with preceding processed images within the sequence of images captured by the mouse. Then, starting from such motion vectors, candidate vectors are generated, in other words vectors that are capable of representing the movement of the mouse between two successive processed images. Subsequently, correlation calculations for the mouse position, examples of which are well know to those skilled in the art, are carried out with respect to these candidate vectors. The candidate vector for which the highest correlation is calculated is then selected. The latter is then associated with the current image.

The term 'processed image' refers to images with which a motion vector has been associated.

In such a context, generally speaking, a correlation calculation relating to a motion vector is based on a comparison of the pixel values of a block of pixels within a image with the values of pixels within the following image that are pointed to by the motion vector associated with the image starting from the pixels of the block of pixels from the image.

Consequently, the higher the quality of the digital images of the sequence of images, the more reliable are the results of this type of correlation calculation and the better the convergence of this type of device, whatever the motion estimation method used.

Digital images of high quality, but which quality depends on the image processing methods used, can be obtained. Accordingly, a bilinear pixel interpolation method is known. Such a method, based on relatively simple mathematical calculations, allows a reasonable quality of image to be obtained at an acceptable cost. However, a motion estimation method applied to such images may diverge under certain conditions. Notably, when the mouse moves slowly relative to the speed of the captured images.

Other image processing methods are known that allow higher quality images to be obtained, such as notably a bicubic interpolation method. By applying a motion estimation method to images obtained with a method of this type, the convergence of such methods is improved and certain distortion effects are prevented. Indeed, the correlation calculations such as those mentioned previously then deliver more reliable results, since they are applied to images of higher digital quality. However, such methods require involved calculations and are therefore costly.

BRIEF SUMMARY OF THE INVENTION

The present disclosure aims to propose alternatives to these methods.

An embodiment of the invention thus provides a method for estimating the movement of an optical mouse equipped with a sensor for capturing a sequence of images to be processed, the method comprising the following steps:

/a/ determining a temporary motion vector relating to a current image as a function of reference data comprising a preceding image and a motion vector associated to the preceding image;

/b/ if the temporary motion vector determined at step /a/ does not satisfy a reliability criterion, repeating step /a/ relating to a following image in the sequence of images, on the basis of the same reference data; otherwise /c/ associating (205) the temporary motion vector with the current image.

By way of such dispositions, a motion vector that satisfies a reliability criterion can be associated with a current image, in other words an image currently being processed, within the sequence of captured images. The following part of the method can then be advantageously based on such an association. In this way, a motion estimation method is obtained that exhibits a superior convergence, without having to make use of an image processing that aims to improve their digital quality, such as for example a bicubic pixel interpolation. Optical mouse systems that are reliable and inexpensive can thus notably be produced. A relatively low digital image quality may thus be compensated for by selecting a motion vector for one or more reliability criteria before associating it with an image, and therefore, before processing the following image or images within the sequence of captured images.

In one embodiment, a motion vector is determined-as a function of data relating to a preceding image within the sequence of images, these data values then being considered as reference data and being used for determining a motion vector corresponding to the current image. Such a step corresponds to step /a/ of a method according to an embodiment of the present invention.

It should be noted that the method according to an embodiment of the present invention can advantageously be applied whatever the technique used at step /a/ for determining a motion vector corresponding to a current image.

In one embodiment, a temporary motion vector satisfies the reliability criterion if its magnitude is greater than a threshold value. Thus, as long as a temporary motion vector determined in relation to a current image does not exhibit a magnitude greater than the threshold value, it is not associated with this current image. In this way, it is not taken into account in the subsequent part of the motion estimation method. The motion vectors that could cause the method to diverge can thus be eliminated.

The situation is the same for motion vectors that have a magnitude substantially lower than the pixel. This is because, when such a motion vector is applied to an image of relatively low quality and when a corresponding correlation calculation is performed with a subsequent image, a motion vector will be determined on the basis of criteria that are unreliable. Consequently, this type of process can diverge if it is based on an association of an image with such a motion vector.

In one embodiment, the reference data comprise, on the one hand, a motion vector associated with a preceding image and, on the other, the preceding image.

In one embodiment of the present invention, following step /c/, steps /a/ and /b/ are carried out in relation to a current image following the preceding current image in the sequence of images as a function of reference data corresponding to the preceding current image.

In one embodiment, step /a/ comprises the steps of:

/1/ generating k candidate vectors by adding k respective search vectors to a reference motion vector;

/2/ selecting one motion vector from amongst the said k candidate vectors as a function of a selection rule;

/3/ repeating the two preceding steps m times, the said reference motion vector being, on the one hand, for a first iteration of step /1/, an initial reference vector selected from amongst a set of vectors comprising at least one motion vector associated with a preceding processed image and being, on the other hand, for the m repetitions of the step /1/, the motion vector selected at step /2/ preceding the said step /1/ and obtaining a temporary motion vector;

m being an integer greater than or equal to 1 and k being an integer greater than 1.

The direction of a first and of a second search vector can be horizontal, and the direction of a third and of a fourth search vector can be vertical; the first and second search vectors, on the one hand, and the third and fourth search vectors, on the other, being of respective opposing senses.

In one embodiment, the amplitude of the search vectors corresponding to the first iteration of step /1/ is determined by selecting the highest value from amongst a threshold value, a horizontal component divided by two and a vertical component divided by two of the motion vector associated with the preceding processed image.

The amplitude of the search vectors corresponding to a repetition of step /1/ can be determined by selecting the highest value from amongst a threshold value, a horizontal component divided by two and a vertical component divided by two of the search vector corresponding to the motion vector-selected at step /2/ preceding the step /1/.

The selection rule applied at step /2/ is based on a correlation calculation of a first block of pixels within the image being processed and of a second block of pixels within the preceding processed image starting from which the candidate vector points to the first block of pixels, the candidate vector that allows the highest correlation being selected.

The set of motion vectors from amongst which the reference motion vector is selected for the first iteration of step /1/ can also comprise the zero vector.

A second aspect of an embodiment of the present invention provides a device for detecting the movement of an entity equipped with a mobile sensor comprising:

a unit for determination of a temporary motion vector designed to receive a current image and reference data at its input and to deliver a temporary motion vector relating to the said current image at its output, the said motion vector being determined as a function of the said reference data;

a test unit designed to receive a temporary motion vector supplied by the said determination unit and, on the one hand, to cause the current image associated with the temporary motion vector to be stored in a memory if the said temporary motion vector satisfies a reliability criterion and, on the other, to cause another current image to be supplied to the determination unit via an image selection unit if the temporary motion vector does not satisfy the reliability criterion;

the said memory designed to store an image and a motion vector associated with the said image;

an image selection unit designed to select an image within the sequence of captured images and to supply the said image to the said determination unit; and a reference data selection unit designed to select reference data comprising the selected image and the associated motion vector and to deliver the said selected reference data to the determination unit after each data storing in the memory.

These units may be implemented, for example, in the form of hardware and/or software.

The test unit can decide that the temporary motion vector satisfies the reliability criterion if the magnitude of the temporary motion vector is greater than a threshold value.

In one embodiment, the reference data selection unit is designed to select reference data comprising the image and the associated motion vector and to supply such selected reference data to the determination unit following each storing of data in the memory.

Accordingly, each time that data values relating to an image associated with a temporary motion vector that satisfies the reliability criterion are stored in the memory, this information is supplied to the determination unit which, in that case, also receives a new current image from the image selection unit.

In one embodiment, the image selection unit is designed to select the image following the preceding selected image.

A third aspect of an embodiment of the present invention provides an optical mouse comprising a mobile image sensor designed to co-operate with a motion estimation device according to the second aspect of an embodiment of the present invention.

A fourth aspect of an embodiment of the present invention provides a computer program product which can be loaded into the internal memory of a digital computer and which comprises portions of software code for the execution of the steps of the method according to the first aspect of an embodiment of the present invention.

Other aspects, aims and advantages of embodiments of the invention will become apparent upon reading the description of one of its embodiments.

In one embodiment, a method for detecting motion of an entity equipped with a sensor capturing a sequence of images to be processed, the method comprising the following steps: determining a temporary motion vector relating to a current image as a function of reference data comprising a preceding image and an motion vector associated to the preceding image; when the temporary motion vector relating to the current image does not satisfy a reliability criterion, determining a temporary motion vector relating to a following image, on the basis of the reference data corresponding to the preceding image; and when the temporary motion vector relating to the current image satisfies the reliability criteria, associating the temporary motion vector with the current image. In one embodiment, the temporary motion vector relating to the current image satisfies the reliability criterion if a magnitude of the temporary motion vector relating to the current image is greater than a threshold value. In one embodiment, the reference data comprises a motion vector associated with a preceding image. In one embodiment, the reference data comprises the preceding image. In one embodiment, the method further comprises, when the temporary motion vector relating to the current image satisfies the reliability criteria, determining a temporary motion vector relating to the following image as a function of reference data corresponding to current image, and when the temporary motion vector relating to the following image does not satisfy the reliability criterion, determining a temporary motion vector relating to a subsequent image, on the basis of the said reference data corresponding to the said current image. In one embodiment, determining a temporary motion vector relating to a current image comprises the steps of: generating k candidate vectors by adding, to a reference motion vector, respectively k search vectors; selecting a motion vector from among the said k candidate vectors as a function of a selection rule; repeating the previous two steps m times, the said reference motion vector being for a first iteration of the generating k candidate vectors, an initial reference vector selected from among a set of vectors comprising at least one motion vector associated with a previous processed image and being for the repetitions of the generating k candidate vectors, the motion vector selected in the previous iteration; associating the vector obtained in a last iteration with the image currently being processed, m being an integer greater than or equal to 1 and k being an integer greater than 1. In one embodiment, a direction of a first and of a second search vector is horizontal, and a direction of a third and of a fourth search vector is vertical; the first and second search vectors being of a sense, and the third and fourth search vectors being of respective opposing senses. In one embodiment, an amplitude of the search vectors corresponding to the first iteration of generating k candidate vectors is determined by selecting a highest value from amongst a threshold value, a horizontal component divided by two and a vertical component divided by two of the motion vector associated with the preceding processed image. In one embodiment, an amplitude of the search vectors corresponding to a repetition of generating k candidate vectors is determined by selecting a highest value from amongst a threshold value, a horizontal component divided by two and a vertical component divided by two of the search vector corresponding to the motion vector selected in the preceding iteration. In one embodiment, the selection rule is based on a correlation calculation of a first block of pixels within the image currently being processed and of a second block of pixels within the preceding processed image starting from which the candidate vector points to the first block of pixels, the candidate vector that allows a highest correlation being selected. In one embodiment, the set of motion vectors from amongst which the reference motion vector is selected for the first iteration comprises a zero vector.

In one embodiment, a device for detecting movement of an entity equipped with a mobile sensor comprises a determination unit configured to receive a current image and reference data at an input and to deliver a temporary motion vector relating to the said current image at an output, the said temporary motion vector being determined as a function of the said reference data, a test unit configured to receive the temporary motion vector supplied by the said determination unit and, to store the current image associated with the temporary motion vector in a memory if the said temporary motion vector satisfies a reliability criterion and, to supply another current image to the determination unit via an image selection unit if the temporary motion vector does not satisfy the reliability criterion, the said memory configured to store the image and the motion vector associated with the said image, an image selection unit configured to select the image within the sequence of captured images and to supply the said image to the said determination unit, and a reference data selection unit configured to select reference data from data values stored in the said memory and to deliver the said selected data. In one embodiment, the test unit is configured to decide that the temporary motion vector satisfies the reliability criterion if a magnitude of the temporary motion vector is greater than a threshold value. In one embodiment, the reference data selection unit is configured to select reference data comprising the image and an associated motion vector and to supply the said selected reference data to the determination unit following each storing of data in the memory. In one embodiment, the image selection unit is configured to select an image following the preceding selected image. In one embodiment, the device further comprises an optical mouse having a mobile image sensor coupled to the input of the determination unit.

In one embodiment, a system for processing image sequences comprises an interface configured to receive an image sequence, a memory configured to store reference data associated with images in the image sequence, a temporary motion vector generator configured to generate a temporary motion vector for an image in the image sequence based on stored reference data associated with a previous image in the image sequence, and a motion vector verifier configured to determine whether a temporary motion vector generated by the temporary motion vector generator satisfies a reliability criteria. In one embodiment, the temporary motion vector generator comprises a candidate vector generator configured to generate a sequence of sets of a plurality of candidate vectors associated with the image in the image sequence, and a motion vector selector configured to sequentially select a motion vector from the sets of candidate vectors according to a selection criteria, wherein the candidate vector generator is further configured to generate a subsequent set of candidate vectors based on a previously selected motion vector in the sequence of selected motion vectors. In one embodiment, the system further comprises an image sensor communicatively coupled to the interface and configured to output the image sequence. In one embodiment, the image sensor comprises a mobile image sensor. In one embodiment, the temporary motion vector generator is further configured to generate a revised temporary motion vector for a subsequent image in the image sequence based on stored reference data associated with the previous image in the image sequence in response to a determination that the reliability criteria was not satisfied.

In one embodiment, a system for processing image sequences comprises means for receiving an image sequence, means for generating a temporary motion vector; and means for determining whether the temporary motion vector satisfies a reliability criteria. In one embodiment, the means for generating a temporary motion vector comprises means for iteratively selecting a motion vector for an image in the image sequence from a sequence of sets of candidate vectors. In one embodiment, the means for iteratively selecting a motion vector comprises a candidate vector generator and a motion vector selector. In one embodiment, the means for iteratively selecting a motion vector is configured to employ two iterations to select the motion vector for an image and a set of candidate vectors in the sequence of sets of candidate vectors comprises four candidate vectors.

In one embodiment, a computer-readable memory medium contains instructions for causing a controller to process an image sequence by performing a method comprising determining a temporary motion vector relating to a current image as a function of reference data comprising a preceding image and a motion vector associated to the preceding image, when the temporary motion vector relating to the current image does not satisfy a reliability criterion, determining a temporary motion vector relating to a following image, on the basis of the said reference data corresponding to the said preceding image, and when the temporary motion vector relating to the current image satisfies the reliability criteria, associating the temporary motion vector with the current image. In one embodiment, determining the temporary motion vector comprises generating a first plurality of candidate vectors for the current image, selecting a first motion vector from the first plurality of candidate vectors based on a selection criteria, generating a second plurality of candidate vectors based on the first motion vector, and selecting a second motion vector for the image in the image sequence from the second set of candidate vectors based on the selection criteria. In one embodiment, the method further comprises generating a first plurality of candidate vectors for a subsequent image in the image sequence based on the second motion vector. In one embodiment, the first plurality of candidate vectors comprises four candidate vectors.

BRIEF DESCRIPTION OF THE SEVERAL VIEWS OF THE DRAWINGS

Embodiments of the invention will also be better understood with the aid of the drawings, in which:

FIGS. 1A and 1B, which have already been commented on, illustrate a motion vector in a motion detection application for an optical mouse;

FIG. 2 illustrates a method of motion estimation method according to one embodiment of the present invention;

DETAILED DESCRIPTION OF THE INVENTION

Figure 3:
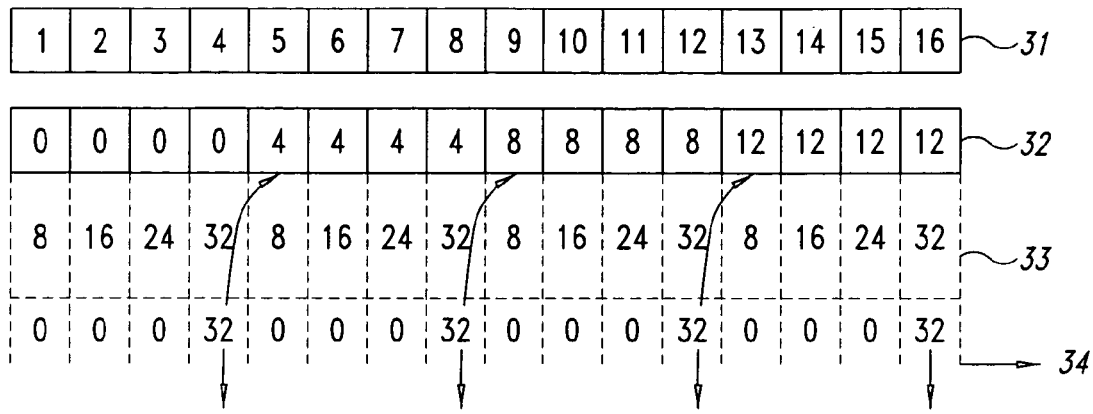
FIG. 3 illustrates an application of a method according to one embodiment.

Embodiments of the present invention are more particularly described in reference to application to an optical mouse. Of course, an application can readily be deduced from this to any system in which an image sequence processing is applied for detecting movements of a mobile sensor relative to the surface over which it moves.

FIG. 2 illustrates the steps of a motion estimation method according to one embodiment of the present invention.

These steps can be advantageously applied in relation to images captured by the mouse and processed by a motion estimation method.

In the following, the images of the sequence captured by the optical mouse are referenced using indices that increase following the order of these images within the sequence.

Accordingly, at a step 201, indices i and j are initialized at 0, i representing the index of the current image and j representing the index of the image corresponding to the reference data as a function of which a temporary motion vector to be associated with the image indexed i is determined.

In one embodiment, reference data corresponding to a image comprise the image, in other words the values of the pixels of this image, together with the motion vector associated with it.

It should be noted that, since the object of the present disclosure is not to determine a method for initializing a motion estimation process of this type, this step will not be described. Furthermore, certain methods for the initialization of this type of process are well known to those skilled in the art. It will be assumed here that the image indexed 0 is already processed and hence has a motion vector already associated with it.

At a step 202, the index i is incremented, the current image is therefore the image indexed 1. Then, at a step 203, a temporary motion vector is determined in relation to the image indexed 1. This step is therefore carried out as a function of the reference data corresponding to the image indexed 0.

At a step 204, the temporary motion vector thus determined is tested against a reliability criterion. If this vector does not satisfy such a criterion, steps 202 and 203 are then repeated. For this purpose, the index of the current image is incremented, and the image indexed 2 is therefore considered, without incrementing the index of the image corresponding to the reference data as a function of which the temporary motion vector is determined.

Consequently, a temporary motion vector relating to the image of index 2 is therefore determined on the basis of the reference data corresponding to the image of index 0.

Thus, by making reference to an image further away in the image sequence in question, a temporary motion vector of greater magnitude is more likely to be obtained.

An embodiment of a method therefore aims to increase the magnitude of the temporary motion vector to be associated with an image being processed. This method is all the more advantageous the higher the speed of the sequence of images with respect to the movement of the mouse. In fact, in such a case, when the mouse is moving in the same direction between two consecutive images of the sequence, the magnitude of the temporary motion vector determined at step /a/ can be small, and the further from one another are the images in question, the greater the magnitude of such a vector becomes.

After a first repetition of steps 202 and 203, at step 204, the reliability of the temporary motion vector determined in relation to the image of index 2, as a function of the reference data corresponding to the image of index 0, is tested.

Steps 202 and 203 are therefore repeated, incrementing the index of the image being processed, without however incrementing the index of the preceding image to which the reference data corresponds, up until a temporary motion vector that satisfies this reliability criterion is determined.

Accordingly, in one embodiment of the present invention, a temporary motion vector satisfies a reliability criterion if its magnitude is greater than a threshold value. This threshold value can advantageously be a configuration value. Such a threshold value can then be adjusted as a function notably of the digital quality of the images of the sequence of captured images.

Then, when, in relation to an image of index p, such a vector satisfying the reliability criterion is determined as a function of the reference data corresponding to the image 0, this vector is associated with the image of index p at a step 205.

Preferably, in the following part of the method according to one embodiment of the invention, the image of index p+1 is then considered as a function of the reference data corresponding to the image of index p.

Accordingly, such a method is subsequently applied to the following image which then becomes the current image and which is processed with respect to the preceding processed image.

FIG. 3 illustrates an application of a method according to one embodiment of the invention. This figure illustrates a case in which the mouse is moved slowly relative to the speed of the images of the sequence of captured images. Such a case is when the mouse moves by ¼ of a pixel between two consecutive images of the sequence.

A table shows successively the indices of the images of the sequence of captured images that are successively processed as current image by a method according to one embodiment of the present invention.

Table 32 shows the indices of the images corresponding to the reference data respectively used for thus successively processing the images of the sequence of images listed in Table 31.

Then, Table 33 shows the magnitudes of the temporary motion vectors respectively determined for the current images whose index is in Table 31 as a function of the reference data corresponding to the respective images whose indices are listed in table 32. The magnitude is expressed here in ¹⁄₃₂ of a pixel.

In one embodiment, a temporary motion vector satisfies a reliability criterion if the magnitude of the vector is greater than or equal to the pixel.

Thus, in the example illustrated in FIG. 3, a temporary motion vector of magnitude equal to ⁸⁄₃₂ of a pixel is determined in relation to the current image of index 1 as a function of reference data corresponding to the image of index 0. Such a vector does not satisfy the reliability criterion such as is stated herein above.

Consequently, step 203 relating to the image of index 2 is repeated as a function of the same reference data as before, in other words those corresponding to the image of index 0.

The temporary motion vector now obtained has a magnitude of ¹⁶⁄₃₂ pixels. The latter does not satisfy the reliability criterion either.

Step 203 relating to the image of index 3 is therefore repeated, and this is still done as a function of the same reference data. A temporary motion vector of magnitude equal to ²⁴⁄₃₂ pixels is determined, which still does not satisfy the reliability criterion. Then, when step 203 relating to the image of index 4 is repeated as a function of the same reference data as before, a temporary motion vector of 1 pixel is determined which, this time, satisfies the reliability criterion.

This vector is then associated with the image of index 4, such as is stated at step 205.

The subsequent determination of a temporary motion vector relating to the image of index 5 is then based on reference data corresponding to the image with which a motion vector has just been associated, which is the image of index 4.

Then, steps similar to those just described are successively carried out in relation to the images of index 5 to 8 as a function of reference data corresponding to the image of index 4.

A temporary motion vector is then determined that satisfies the reliability criterion between the image of index 4 and the image of index 8.

Consequently, this motion vector is associated with the image of index 8.

Then, the images indexed 9 to 12 are successively processed in a similar manner with respect to reference data corresponding to the image of index 8, with which a motion vector has just been associated.

A temporary motion vector is determined that satisfies the reliability criterion in relation to the image of index 12. This motion vector is then associated with this latter image.

The same steps are subsequently successively repeated in a similar manner in relation to the images indexed 13 to 16 with respect to reference data corresponding to the image of index 12, with which a motion vector has just been associated.

A temporary motion vector that satisfies the reliability criterion relating to the image of index 16 is determined. This motion vector is then associated with this latter image.

Table 34 shows the values of motion vectors stored in memory where they are to be read by a display function designed to transcribe the movement of the mouse thus detected in the form of a movement of a cursor on the screen of a computer. It should be noted that, advantageously, only the temporary motion vectors satisfying the reliability criterion are stored. Such a storage scenario allows the display function to read this data in an asynchronous manner.

The method is simple, fast to implement and allows a reliable motion vector to be selected for the images of the sequence of images captured by a mouse.

Figure 4:
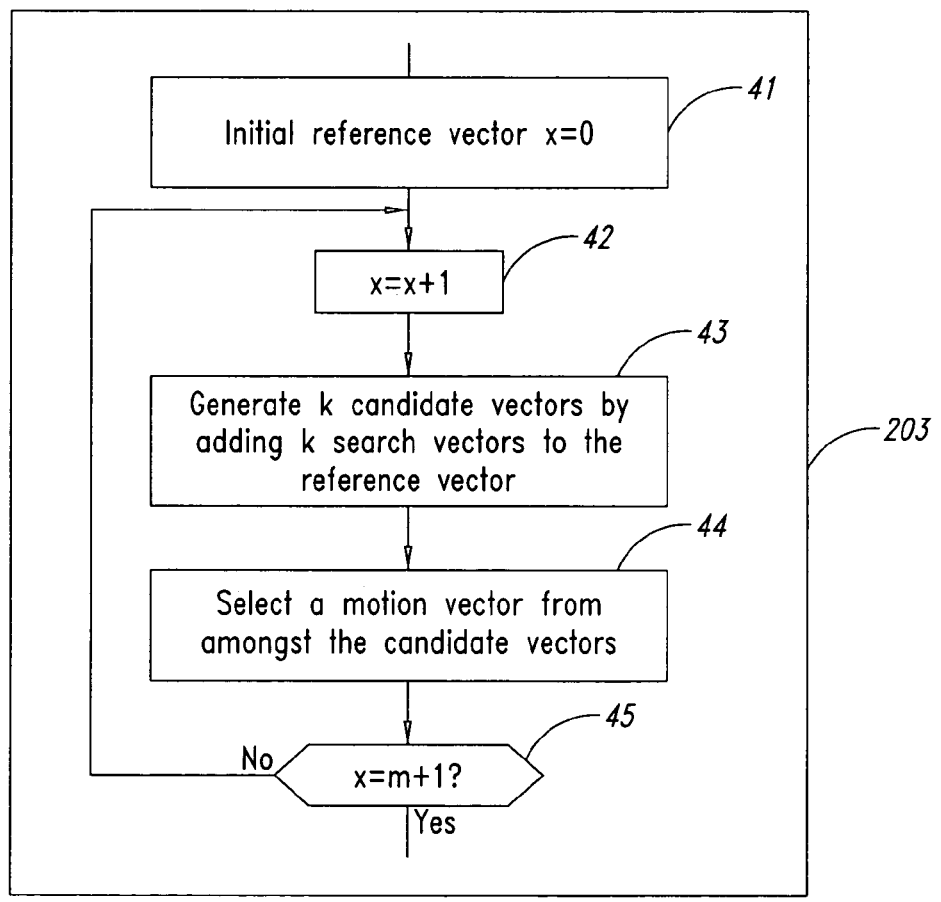
FIG. 4 details the steps that are implemented for determining a temporary motion vector at step /a/ of a motion detection method according to one embodiment.

FIG. 4 illustrates the steps that are implemented for determining a temporary motion vector according to one embodiment of the present invention.

These steps can be applied to each image captured by the image sensor integrated into the mouse. In certain circumstances, it may be advantageous to only process a part of the captured images using these steps.

Accordingly, for an image being processed, an initial reference motion vector is first of all selected from amongst a set of motion vectors. In one embodiment of the invention, this set comprises the zero component vector together with the motion vector associated with the previously processed image in the sequence of captured images. Then, the initial reference vector is selected according to a rule that will be detailed below.

At step 41, the method is initialized with an initial reference vector and an index x is initialized at 0.

Then, at step 42, the index x is incremented by one unit.

Subsequently, at step 43, k candidate vectors are generated, k being an integer number greater than 1. These candidate vectors are generated by respectively adding k search vectors to the initial reference vector. Two of these vectors can be in the horizontal direction and of respective opposing senses, whereas the two others are in the vertical direction and of respective opposing senses. The number of these k search vectors can therefore advantageously be four. However, there may be fewer or more in directions other than the vertical or horizontal.

At step 44, a motion vector is selected from amongst the candidate vectors thus generated. Such a selection can be made on the basis of various criteria which will be described below.

The steps 42, 43 and 44 are performed m+1 times, m being an integer greater than 1. For this purpose, at step 45, the value of the index x is compared with the value m. In the case where x is less than m, steps 42 to 45 are repeated.

In this case, each time that step 43 is repeated, the reference motion vector is the motion vector selected at step 44 which has just been carried out.

After m repetitions of steps 42 to 44, a temporary motion vector has been determined and therefore step 203 is done.

All or part of these associated motion vectors can be stored in a memory. They can thus be read asynchronously by a display function that bases the movement of a symbol (for example a cursor) over a computer screen on these vectors, which movement therefore follows the movement of the optical mouse.

Figure 5:
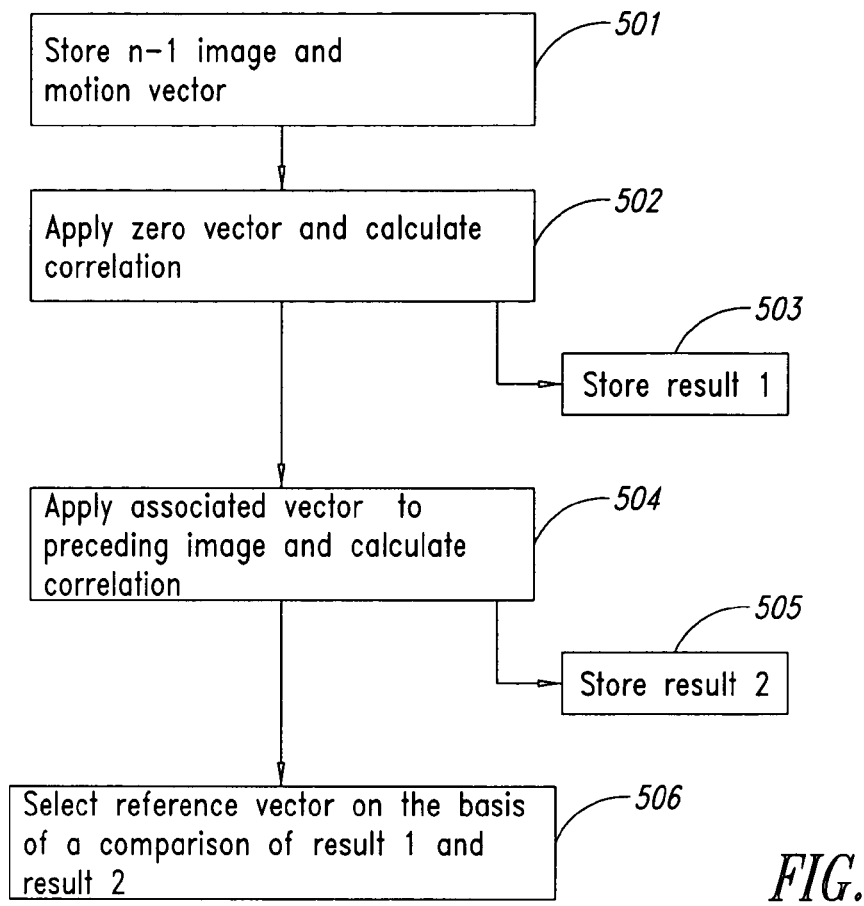
FIG. 5 illustrates a step of obtaining an initial reference vector of a method according to one embodiment.

FIG. 5 illustrates a step for obtaining an initial reference vector in a method according to one embodiment.

For the following, the successive images of the sequence of captured images are indexed. With reference to FIG. 5, the image being processed is the image of index n, the previously processed image being the image of index n−1. It should be noted that the previously processed image may not necessarily be the preceding image within the sequence of captured images. In fact, under certain conditions, it can be advantageous not to process all the captured images of the image sequence.

The captured images each comprise a number N of pixels, where this number can notably be equal to 400, for example for an image with dimensions of 20 pixels by 20 pixels.

In such an embodiment, the set of motion vectors from which an initial reference motion vector is selected comprises the zero vector and the motion vector associated with the preceding processed image. It should be noted here that such a method can be adapted to a set of vectors comprising a larger number of motion vectors.

Furthermore, a block of pixels within the N pixels representing the image n−1 is preferably defined, and the following steps are applied to the pixels of this block of pixels. A block of pixels with 14 pixels by 14 pixels may for example be considered.

Thus, at step 501, the N pixels of the previously processed image n−1 and the motion vector associated with this image are stored in memory.

At step 502, the zero vector is applied to the block of pixels defined in the image n−1 and a correlation calculation is performed between the values of the pixels from the block of pixels of the image n−1 and the values of the pixels of the corresponding block of pixels pointed to in the image n. For this purpose, for each of the pixels of the window, the difference between the value of this pixel and the value of the pixel pointed to by the zero vector in the image n can for example be calculated. The sum of the absolute values of the differences thus obtained is then performed and a first correlation result is obtained.

At step 503, the result of this correlation is then weighted by a value, which is preferably a configuration value, before being stored in memory. Such a weighting is of course optional and aims to improve the precision of such a method. A weighting value can advantageously be determined as a function of the speed of the images in the sequence of captured images.

At step 504, to the block of pixels in question in the image n−1 is then applied to the motion vector already associated with this image. A correlation calculation is then performed. For this purpose, preferably, for each of the pixels of the block of pixels in question in the image n−1, the difference is calculated between the value of a pixel in the image n−1 and the value of the corresponding pixel in the image n, in other words the pixel of the image n to which the motion vector associated with the image n−1 points starting from the pixel.

The sum of the absolute values of the differences is performed and a second correlation result is therefore obtained which is stored in memory at step 505.

It should be noted that steps 502 and 504 may be carried out in any order.

At step 506, the first and the second correlation results are compared, and on the basis of this comparison, the vector that allows the highest correlation to be obtained is selected from between the zero vector and the motion vector associated with the image n−1.

Figure 6:
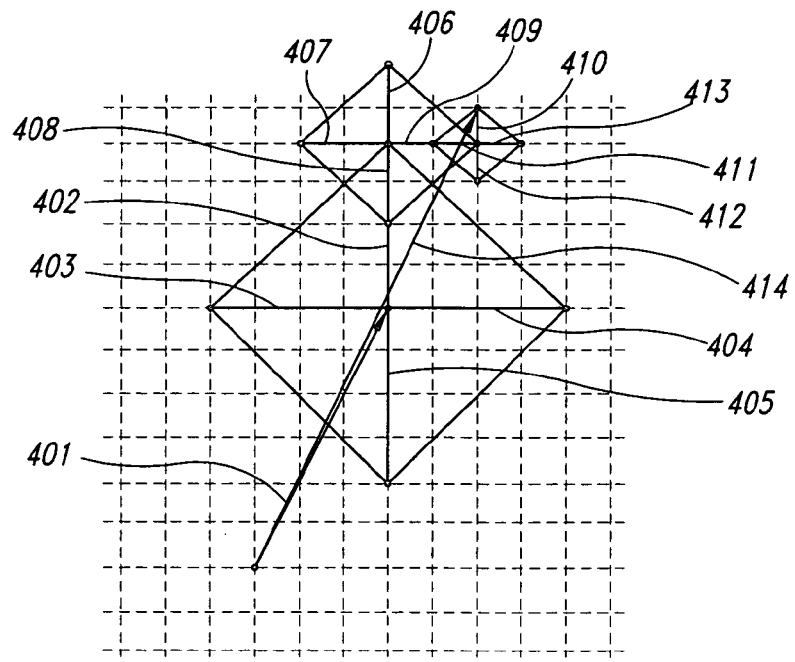
FIG. 6 illustrates, with the aid of the vectors shown, various steps of a method according to one embodiment.

FIG. 6 illustrates, by means of the vectors shown, various steps of a method according to one embodiment of the present invention. This vector representation is made on a grid of squares whose length of side corresponds to a fraction of a pixel. Such a length can for example be equal to $\frac{1}{32}^{nd}$ of the length of a pixel.

A vector 401 represents the initial reference motion vector, starting from which the various steps of the method according to one embodiment, such as is illustrated in FIG. 4, are applied. In one embodiment, the vector 401 is the motion vector associated with the image n−1. In the example described, the value of m is considered to be equal to 2.

On the first iteration of step 42, the index i is equal to 1.

Then, at step 43, in the example illustrated in FIG. 6, four candidate vectors are generated starting from the reference motion vector 401, of coordinates $X_{ref}$ and $Y_{ref}$, by adding four respective search vectors to it. The first candidate vector is obtained by adding to the motion vector referenced 401, a first search vector of vertical component zero and of horizontal component determined as a function of at least one component of the initial reference motion vector.

The coordinates of the first search vector, denoted $X_1$ and $Y_1$, can thus, for example, be determined according to the following equation:

$$X_1 = \text{Max}\ [val_{th}; \tfrac{1}{2}*|X_{ref}|; \tfrac{1}{2}*|Y_{ref}|)]$$

$$Y_1 = 0$$

where $val_{th}$ is a, preferably, configurable threshold value which allows a certain amplitude of the search vector to be guaranteed, whatever the components of the reference motion vector.

The first search vector 404 is then obtained.

Then, the coordinates of the second search vector can satisfy the following equation:

$$X_2 = -\text{Max}\ [val_{th}; \tfrac{1}{2}*|X_1|; \tfrac{1}{2}*|Y_1|)]$$

$$Y_2 = 0$$

The second search vector 403 is thus obtained.

Then the coordinates of the third search vector can satisfy the following equation:

$$X_3 = 0$$

$$Y_3 = \text{Max}\ [val_{th}; \tfrac{1}{2}*|X_2|; \tfrac{1}{2}*|Y_2|)]$$

The third search vector 402 is then obtained.

Then the coordinates of the fourth search vector can satisfy the following equation:

$$X_4 = 0$$

$$Y_4 = -\text{Max}\ [val_{th}; \tfrac{1}{2}*|X_3|; \tfrac{1}{2}*|Y_3|)]$$

The fourth search vector 405 is then obtained.

It should be noted that the threshold value is preferably taken into account in determining the components of the search vectors in order to improve the convergence of such a method. However, in one variant, the search vectors can be determined using the coordinates of the corresponding reference vector without employing a threshold value.

At the end of step 43, the following four candidate vectors are therefore obtained:

$$V_{cand1} = V(X_{ref}, Y_{ref}) + V(X_1, Y_1) \quad (1)$$

$$V_{cand2} = V(X_{ref}, Y_{ref}) + V(X_2, Y_2) \quad (2)$$

$$V_{cand3} = V(X_{ref}, Y_{ref}) + V(X_3, Y_3) \quad (3)$$

$$V_{cand4} = V(X_{ref}, Y_{ref}) + V(X_4, Y_4) \quad (4)$$

Step 44, whose aim is to select a vector from amongst these candidate vectors, is then carried out.

For this purpose, a correlation calculation is preferably performed in relation to each of these candidate vectors.

The calculation of the absolute sums of the differences relating to each of these candidate vectors can be used, as previously described.

The candidate vector exhibiting the best correlation is then selected. In the example described, the candidate vector $V_{cand3}$ is selected.

Step 42 and step 43 are re-iterated. At this latter step, the reference motion vector considered is advantageously the motion vector that has just been selected at the preceding step 44, in other words the vector $V_{cand3}$.

Then, four candidate vectors are again generated using this new reference motion vector and four search vectors.

The coordinates of these search vectors can, for example, be determined in the same manner as during the first iteration of this step. The first search vector 409, the second search vector 407, the third search vector 406 and, finally, the fourth search vector 408 are then obtained.

The candidate vectors obtained in the second iteration of step 43 respectively satisfy equations (1), (2), (3) and (4) by considering the search vectors 409, 407, 406 and 408.

Corresponding correlation calculations are then performed, for example in the manner such as was previously described. Then, the candidate vector exhibiting the highest correlation is selected. In the example illustrated, the motion vector $V_{cand1}$ is thus selected.

Steps 42 to 45 are then re-iterated for a last time by considering the motion vector that has just been selected at step 44, $V_{cand1}$, as reference motion vector. In the same way as previously indicated, the four search vectors 413, 411, 410 and 412, such as are illustrated in FIG. 6, are obtained.

The four candidate vectors are then generated using the new reference motion vector and the corresponding search vectors which can advantageously be determined as previously described. Step 44 for selection of motion vectors from amongst the four candidate vectors is then carried out for the third time. For this purpose, the same methods can be used as those previously described with reference to the preceding iterations of step 44.

Since the number m is equal to 3, a temporary motion vector corresponding to the last motion vector selected, referenced 414, is then obtained.

Figure 7:
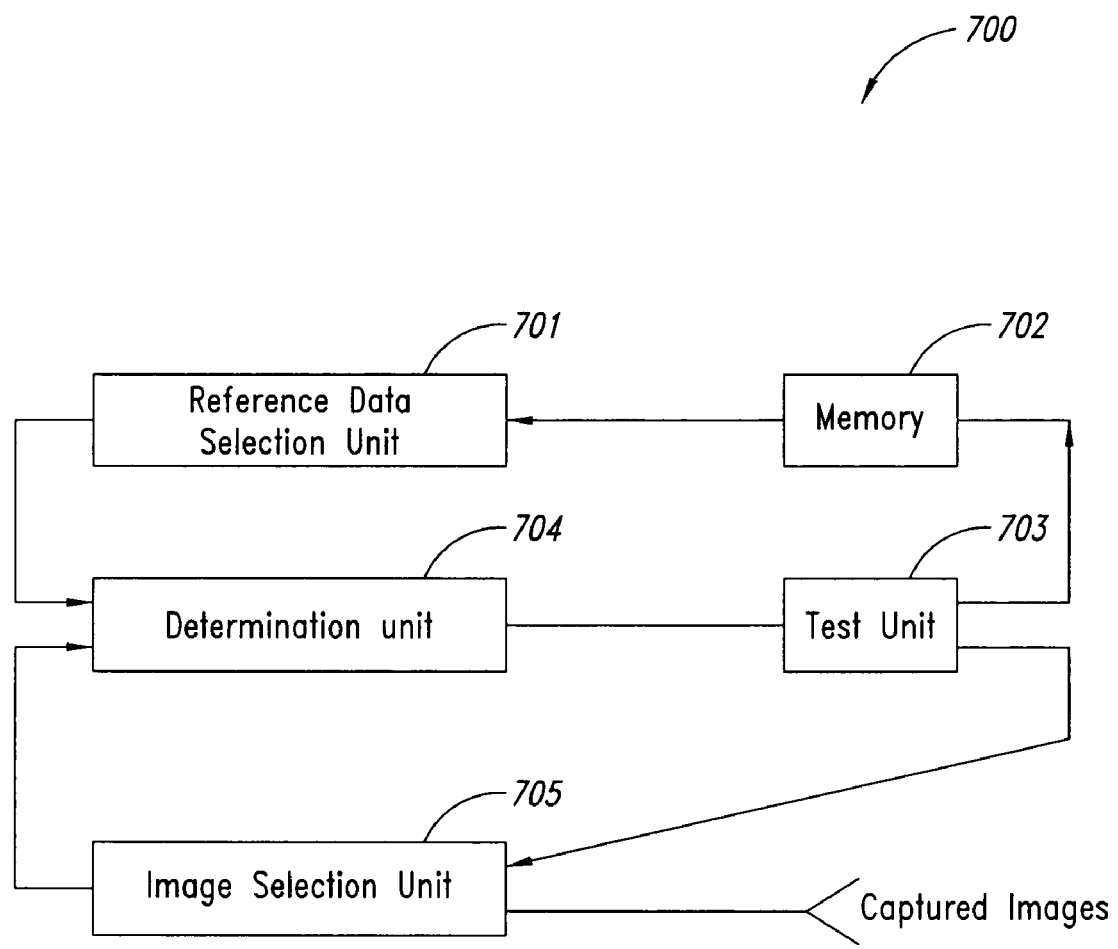
FIG. 7 illustrates a device for detecting the motion of an entity equipped with a mobile sensor, according to one embodiment.

FIG. 7 illustrates a device 700 for detecting the movement of an entity equipped with a mobile sensor, according to one embodiment of the present invention.

Such a device comprises a temporary motion vector determination unit 704. This unit is designed, on the one hand, to receive at its input a current image, in other words an image to be processed, and reference data and, on the other, to deliver at its output a temporary motion vector relating to the current image as a function of the data received at the input. As already stated previously, the temporary motion vector is determined as a function of the reference data.

Such a device also comprises an image selection unit 705 designed to select an image within the sequence of captured images and to supply it to the determination unit 704, as the current image.

It also comprises a reference data selection unit 701 designed to select reference data from data stored in a memory 702. In one embodiment of the present invention, the data values stored in such a memory are data values relating to images of the sequence of images already processed, in other words with which a motion vector has already been associated.

This device also comprises a test unit 703 designed to receive a temporary motion vector supplied by the determination unit. Depending on the result of such a test on the temporary motion vector, different operations are carried out. Thus, if the temporary motion vector satisfies a reliability criterion, the current image is associated with the temporary motion vector, and this association is then stored in the memory 702. The current image then becomes an image processed by the method according to one embodiment of the present invention.

On the other hand, if the temporary motion vector does not satisfy the reliability criterion, another image selected from within the sequence of captured images by the image selection unit 705 is then supplied to the determination unit 704.

Thus, in such a case, the determination unit is able to determine, as a function of the same reference data as that used in the preceding determination of a temporary motion vector, a temporary motion vector relating to the newly selected current image.

Thus, if the temporary motion vector does not satisfy the reliability criterion, the image selection unit 705 selects the image that follows, in the sequence of images, the previously considered current image. However, in this case, the reference data selection unit 701 does not select different reference data, which does not therefore supply new data to the determination unit 704.

When an image is associated with a motion vector, that therefore satisfies the reliability criterion, the image selection unit 705 selects the image that follows the image that has just been associated with a motion vector and supplies it to the determination unit. In such a case, the reference data selection unit 701 selects from the memory 702 reference data corresponding to the image that has just been associated with a motion vector.

Thus, the determination unit, receiving at its input this reference data selected by the selection unit 701 and the image selected by the selection unit 705, is able to determine a new temporary motion vector and to supply it to the test unit which processes it in the manner described herein above.

In one embodiment, the image selection unit 705 successively selects the images from the sequence of images.

In one embodiment, the reference data selection unit 701 selects the last image associated with a motion vector stored in the memory 702.

In one embodiment, the test unit decides that the temporary motion vector satisfies the reliability criterion if the magnitude of the temporary motion vector is greater than a threshold value.

Embodiments of the invention facilitate a more precise estimation of movement and, consequently, a better rendering of the movement of the optical mouse cursor over a screen, notably in the case of rapid movements of the mouse. It can advantageously be implemented in any motion estimation method, and can be implemented easily and at a reasonable cost.

Figure 8:
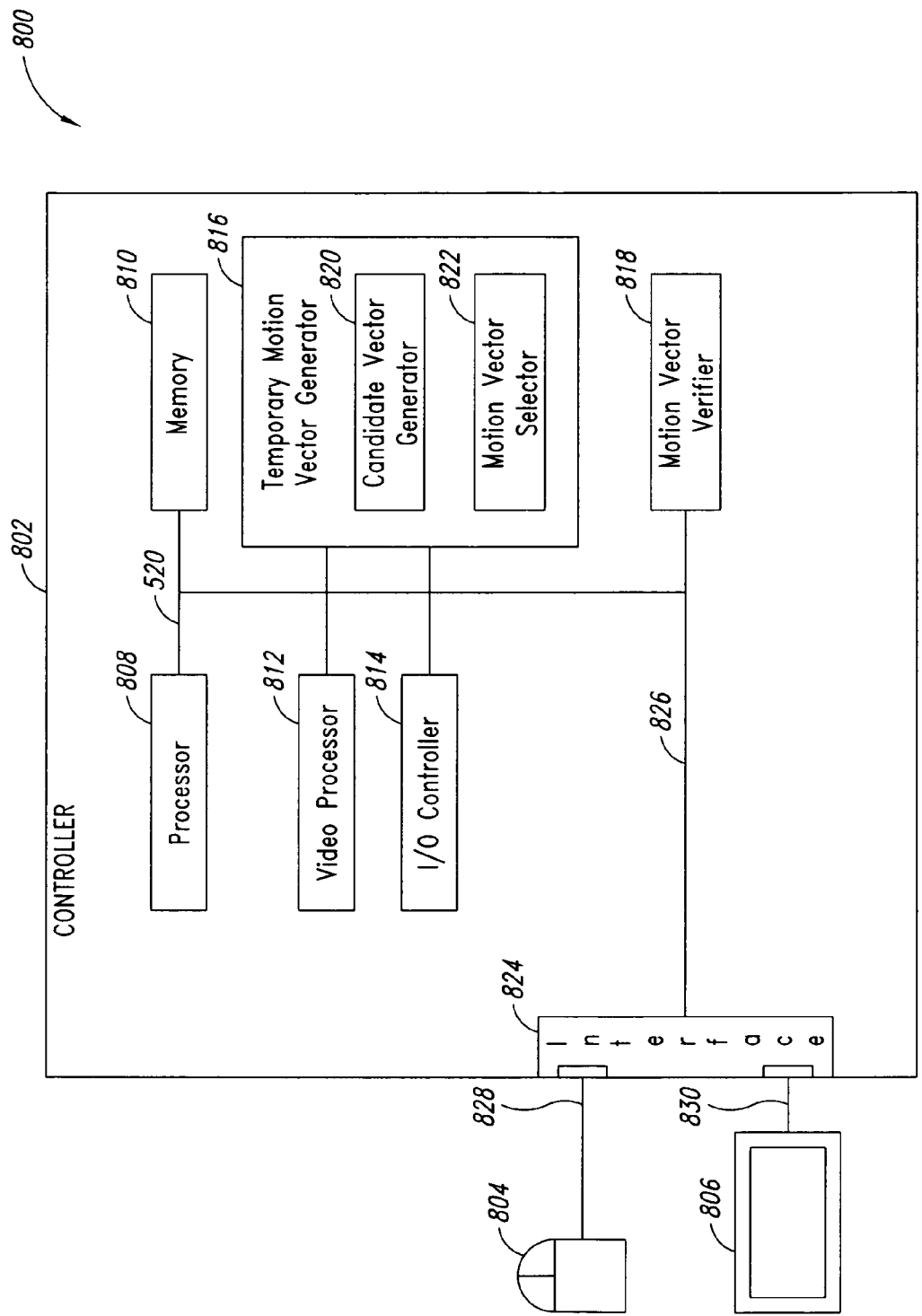
FIG. 8 is a functional block diagram of a system according to an embodiment of the present invention.

FIG. 8 is a functional block diagram of a system 800 in accordance with an embodiment of the invention. The system 800 comprises a controller 802, an image sensor 804 and a display 806. The image sensor 804 and the display 806 are communicatively coupled to the controller 802 via communication links 828, 830. The communication links 828, 830 may comprise, for example, wires, bus systems, wireless communication links, and/or combinations of the above. The controller 802 may comprise, for example, a computer system. The image sensor 804 may comprise, for example, an optical mouse. The display 806 may comprise, for example, an LCD display.

The controller 802 comprises a processor 808, a memory 810, a video processor 812, an I/O controller 814, a temporary motion vector generator 816, a motion vector verifier 818, a bus system 826, and an interface 824 to receive image sequences from the image sensor 804 and to provide video signals to the display 806. As illustrated, the temporary motion vector generator 816 includes a candidate vector generator 820, and a motion vector selector 822.

The temporary motion vector generator 816 is configured to generate a motion vector associated with movement of an image sensor. The candidate vector generator 820 is configured to generate candidate vectors by, for example, adding search vectors to a reference motion vector. The motion vector selector 822 is configured to select a motion vector from the candidate vectors generated by the candidate vector generator 820. The motion vector verifier 818 is configured to verify that a temporary motion vector satisfies a reliability criteria.

The controller 802 may be implemented in a variety of ways, including as separate subsystems. For example, the controller 802 may be implemented as a microprocessor, a digital signal processor (DSP), an application-specific integrated circuit (ASIC), or the like, or as a series of instructions stored in a memory, such as the memory 810, and executed by a processor, such as the processor 808, or various combinations of the above. Thus, software modifications to existing hardware may allow the implementation of the system 800.

Various subsystems, such as the video processor 812, I/O controller 814, temporary motion vector generator 816, motion vector verifier 818, candidate vector generator 820 and/or the motion vector selector 822 of the controller 802, are identified as separate blocks in the functional block diagram of FIG. 8 because they perform specific functions, as described in more detail above. These subsystems may be discrete units. For example, the I/O controller 814 may be implemented with a discrete circuit. The subsystems also may not be discrete units but may be functions of a software routine, which will probably, but not necessarily, be separately callable and hence identifiable elements. For example, the temporary motion vector generator 816 may be implemented by a software routine stored in the memory 810 and executed by the processor 808. The various subsystems may be combined. For example, in some embodiments all or portions of the temporary motion vector generator 816 may be integrated into the video processor 812.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for detecting motion of an entity equipped with a sensor capturing a sequence of images to be processed, the method comprising using at least one processor to perform the following steps:

determining a temporary motion vector relating to a current image as a function of reference data comprising a preceding image and a movement vector associated with the preceding image, wherein determining the temporary motion vector relating to the current image comprises:

generating k candidate vectors by adding, to a reference motion vector selected from among a set of vectors including at least one movement vector associated with a previous processed image, respectively k search vectors, k being an integer greater than 1; and selecting a motion vector from among the k candidate vectors as a function of a selection rule;

when the temporary motion vector relating to the current image does not satisfy a reliability criterion, indicating the temporary motion vector relating to the current image is not reliable, determining a temporary motion vector relating to a following image, on the basis of the same reference data; and when the temporary motion vector relating to the current image satisfies the reliability criterion, indicating the temporary motion vector relating to the current image is reliable, setting a movement vector associated with the current image equal to the temporary motion vector, wherein an amplitude of search vectors of a first generating of k candidate vectors is determined by selecting a highest value from amongst a threshold amplitude, a horizontal component divided by two of the movement vector associated with the preceding processed image and a vertical component divided by two of the movement vector associated with the preceding processed image.

2. The method of claim 1 wherein the temporary motion vector relating to the current image satisfies the reliability criterion if a magnitude of the temporary motion vector relating to the current image is greater than a threshold value.

3. The method of claim 1, further comprising:
when the temporary motion vector relating to the current image satisfies the reliability criteria,
determining a temporary motion vector relating to the following image as a function of reference data corresponding to current image; and
when the temporary motion vector relating to the following image does not satisfy the reliability criterion, determining a temporary motion vector relating to a subsequent image, on the basis of the said reference data corresponding to the said current image.

4. The method of claim 1 wherein determining the temporary motion vector relating to the current image further comprises the steps of:
repeating the generating k candidate vectors and selecting m times, the reference motion vector being for repetitions of the generating k candidate vectors, the motion vector selected in a previous iteration;
associating a vector obtained in a last iteration with the image currently being processed, m being an integer greater than or equal to 1.

5. The method of claim 4 wherein a direction of a first and of a second search vector is horizontal, and a direction of a third and of a fourth search vector is vertical; the first and second search vectors being of a direction, and the third and fourth search vectors being of respective opposing directions.

6. The method of claim 4 wherein an amplitude of the search vectors corresponding to a repetition of generating k candidate vectors is determined by selecting a highest value from amongst a threshold value, a horizontal component divided by two and a vertical component divided by two of the search vector corresponding to the motion vector selected in the preceding iteration.

7. The method of claim 4 wherein the selection rule is based on a correlation calculation of a first block of pixels within the image currently being processed and of a second block of pixels within the preceding processed image starting from which the candidate vector points to the first block of pixels, the candidate vector that allows a highest correlation being selected.

8. The method of claim 4 wherein the set of motion vectors from amongst which the reference motion vector is selected for the first iteration comprises a zero vector.

9. A device for detecting movement of an entity equipped with a mobile sensor comprising:
a determination unit configured to:
receive a current image and reference data at an input;
generate k motion candidate vectors by adding to a reference motion vector selected from among a set of vectors including at least one movement vector associated with a previous processed image, respectively k search vectors, k being an integer greater than 1;
select a motion vector from among the k candidate vectors as a function of a selection rule;
repeat the generating k candidate vectors and selecting m times, the reference motion vector being for repetitions of the generating k candidate vectors, the motion vector selected in a previous iteration, m being an integer greater than or equal to 1; and
provide a temporary motion vector which is a vector obtained in a last iteration of the repeating and selecting;
a test unit configured to receive the temporary motion vector provided by the determination unit and,
if the temporary motion vector satisfies a reliability criteria indicating the temporary motion vector is reliable, to set a movement vector associated with the current image equal to the temporary motion vector and store the current image associated with the movement vector and the movement vector in a memory; and
to supply another current image to the determination unit via an image selection unit if the temporary motion vector does not satisfy the reliability criterion, indicating the temporary motion vector is not reliable;
an image selection unit configured to select the image within the sequence of captured images and to supply the image to the determination unit; and
a reference data selection unit configured to select reference data comprising the selected image and the associated movement vector and to deliver the selected reference data to the determination unit after each data storing in the memory, wherein an amplitude of search vectors of a first generating of k candidate vectors is determined by selecting a highest value from amongst a threshold amplitude, a horizontal component divided by two of the movement vector associated with the preceding processed image and a vertical component divided by two of the movement vector associated with the preceding processed image.

10. The device of claim 9 wherein the test unit is configured to decide that the temporary motion vector satisfies the reliability criterion if a magnitude of the temporary motion vector is greater than a threshold value.

11. The device of claim 9 wherein the image selection unit is configured to select an image following the preceding selected image.

12. The device of claim 9, further comprising an optical mouse having a mobile image sensor coupled to the input of the determination unit.

13. A system for processing image sequences, comprising:
a memory configured to store reference data associated with images in an image sequence, the reference data comprising reference vectors associated with respective images;
a temporary motion vector generator configured to generate a temporary motion vector for an image in the image sequence based on stored reference data associated with a previous image in the image sequence, wherein the temporary motion vector generator comprises a candidate vector generator configured to generate a sequence of sets of a plurality of candidate vectors associated with the image in the image sequence, the candidate vector generator configured to generate the first set of candidate vectors associated with the image by adding a set of search vectors to a reference vector associated with a previous image, wherein the candidate vector generator is configured to determine an amplitude of the set of search vectors by selecting a highest value from amongst a threshold amplitude, a horizontal component divided by two of the reference vector associated with the previous image and a vertical component divided by two of the reference vector associated with the previous image; and a motion vector verifier configured to determine whether a temporary motion vector generated by the temporary motion vector generator satisfies a reliability criteria indicating the temporary motion vector generated by the temporary motion vector generator is reliable, wherein when the reliability criteria indicates the temporary motion vector is reliable, the system is configured to set a reference vector equal to the temporary motion vector and associate the reference vector with the image, and when the reliability criteria indicates the temporary motion vector is not reliable, the temporary motion vector generator is configured to generate a revised temporary motion vector for a subsequent image in the image sequence based on the stored reference data associated with the previous image in the image sequence.

14. The system of claim 13 wherein the temporary motion vector generator comprises:
a motion vector selector configured to sequentially select a motion vector from the sets of candidate vectors according to a selection criteria, wherein the candidate vector generator is further configured to generate a subsequent set of candidate vectors based on a previously selected motion vector in the sequence of selected motion vectors.

15. The system of claim 13, further comprising:
an interface configured to receive the image sequence; and
an image sensor communicatively coupled to the interface and configured to output the image sequence.

16. The system of claim 15 wherein the image sensor comprises a mobile image sensor.

17. A system for processing image sequences, comprising:
means for receiving an image sequence;
means for generating a temporary motion vector including means for iteratively selecting a motion vector for an image in the image sequence from a sequence of sets of candidate vectors, wherein a first set of candidate vectors is generated by adding a set of search vectors to a movement vector associated with a previous image and an amplitude of the set of search vectors is determined by selecting a highest value from amongst a threshold amplitude, a horizontal component divided by two of the movement vector associated with the previous image and a vertical component divided by two of the movement vector associated with the previous image; and
means for determining whether the temporary motion vector satisfies a reliability criteria indicating the temporary motion vector is reliable, wherein when the reliability criteria indicates the temporary motion vector is reliable, the means for determining causes the system to set a movement vector equal to the temporary motion vector and associate the movement vector with the image, and when the reliability criteria indicates the temporary motion vector is not reliable, the means for determining causes the means for generating motion vector generator to generate a revised temporary motion vector for a subsequent image in the image sequence based on the motion vector associated with the previous image.

18. The system of claim 17 wherein the means for iteratively selecting a motion vector comprises:
a candidate vector generator; and
a motion vector selector.

19. The system of claim 17 wherein the means for iteratively selecting a motion vector is configured to employ two iterations to select the motion vector for an image and a set of candidate vectors in the sequence of sets of candidate vectors comprises four candidate vectors.

20. A non-transitory computer-readable memory medium containing instructions for causing a controller to process an image sequence by performing a method comprising:
determining a temporary motion vector relating to a current image as a function of reference data comprising a preceding image and a movement vector associated with the preceding image, wherein the determining comprises:
generating a first set of candidate vectors by adding a set of search vectors to the movement vector associated with the preceding image, wherein an amplitude of the set of search vectors is determined by selecting a highest value from amongst a threshold amplitude, a horizontal component divided by two of the movement vector associated with the preceding image and a vertical component divided by two of the movement vector associated with the preceding image; and
selecting a first motion vector from the first set of candidate vectors as a function of a selection criteria;
when the temporary motion vector relating to the current image does not satisfy a reliability criterion, indicating the temporary motion vector is not reliable, determining a temporary motion vector relating to a following image, on the basis of the same reference data; and
when the temporary motion vector relating to the current image satisfies the reliability criterion, indicating the temporary motion vector is reliable, setting a movement vector equal to the temporary motion vector and associating the movement vector with the current image.

21. The non-transitory computer-readable memory medium of claim 20 wherein determining the temporary motion vector further comprises:
generating a second plurality of candidate vectors based on the first motion vector; and
selecting a second motion vector for the image in the image sequence from the second set of candidate vectors based on the selection criteria.

22. The non-transitory computer readable memory medium of claim 21 wherein the method further comprises:
generating a first plurality of candidate vectors for a subsequent image in the image sequence based on the second motion vector.

23. The non-transitory computer readable memory medium of claim 21 wherein the first plurality of candidate vectors comprises four candidate vectors.

24. A method, comprising:
selecting, using at least one processor, images in a sequence of images captured by a sensor, the selecting including: determining a temporary motion vector relating to a current image as a function of reference data comprising a preceding image and a movement vector associated with the preceding image, wherein determining the temporary motion vector relating to the current image includes generating k candidate vectors by adding, to a reference motion vector, respectively k search vectors, a first set of k search vectors having an amplitude determined by selecting a highest value from amongst a threshold amplitude, a horizontal component divided by two of the movement vector associated with the preceding image and a vertical component divided by two of the movement vector associated with the preceding image;

determining whether the temporary motion vector satisfies a reliability criteria;

when the temporary motion vector does not satisfy the reliability criteria, not selecting the current image; and when the temporary motion vector satisfies the reliability criteria, selecting the current image and associating a movement vector with the current image, the movement vector associated with the current image being equal to the temporary motion vector, wherein the reliability criteria is not satisfied when a magnitude of the temporary motion vector is less than a threshold value; and generating display control signals based on a set of movement vectors limited to movement vectors based on temporary motion vectors satisfying the reliability criteria.

25. The method of claim 24 wherein the selecting further includes:

when the temporary motion vector relating to the current image satisfies the reliability criteria, determining a temporary motion vector relating to a following image as a function of reference data corresponding to the current image; and when the temporary motion vector relating to the following image does not satisfy the reliability criterion, determining a temporary motion vector relating to a subsequent image, on the basis of the reference data corresponding to the current image.

26. The method of claim 24 wherein determining the temporary motion vector relating to the current image comprises:

selecting a motion vector from among the k candidate vectors as a function of a selection rule; and repeating the generating and selecting of candidate vectors m times, the reference motion vector being for a first iteration of the generating k candidate vectors, an initial reference vector selected from among a set of vectors comprising at least one movement vector associated with a previous processed image and being for the repetitions of the generating k candidate vectors, the motion vector selected in the previous iteration, m being an integer greater than or equal to 1 and k being an integer greater than 1.

27. The method of claim 26 wherein the selection rule is based on a correlation calculation of a first block of pixels within the image currently being processed and of a second block of pixels within the preceding processed image starting from which the candidate vector points to the first block of pixels, the candidate vector that allows a highest correlation being selected.

28. A device, comprising:

a memory configured to store images and reference data including movement vectors;

a determination unit configured to receive stored images and reference data and to generate temporary motion vectors relating to respective images, the temporary motion vectors being determined as a function of the reference data, wherein the determination unit is configured to generate k candidate vectors by adding, to a reference motion vector, respectively k search vectors and to determine an amplitude of a first set of k search vectors by selecting a highest value from amongst a threshold amplitude, a horizontal component divided by two of a movement vector associated with a preceding image and a vertical component divided by two of the movement vector associated with the preceding image;

a test unit configured to:
receive temporary motion vectors generated by the determination unit;

determine whether received temporary motion vectors satisfy a reliability criteria, wherein the test unit is configured to determine a received motion vector does not satisfy the reliability criteria when a magnitude of the received temporary motion vector is less than a threshold value;

when the test unit determines the reliability criteria is satisfied by the received temporary motion vector, associate a movement vector based on the received temporary motion vector with the related image and store the associated movement vector and related image in the memory;

when the test unit determines the reliability criteria is not satisfied by the received temporary motion vector, cause a subsequent image to be provided to the determination unit; and provide a set of the movement vectors to generate display control signals, the set limited to movement vectors based on temporary motion vectors satisfying the reliability criteria.

29. The device of claim 28, further comprising an optical mouse having a mobile image sensor coupled to an input of the determination unit.

30. The device of claim 28 wherein the determination unit is configured to:

select a motion vector from among the k candidate vectors as a function of a selection rule; and repeating the generating and selecting of candidate vectors m times, the reference motion vector being for a first iteration of the generating k candidate vectors, an initial reference vector selected from among a set of vectors comprising at least one movement vector associated with a previous processed image and being for the repetitions of the generating k candidate vectors, the motion vector selected in the previous iteration, m being an integer greater than or equal to 1 and k being an integer greater than 1.

31. A system for processing image sequences, comprising:

a memory configured to store reference data associated with images in an image sequence, the reference data comprising reference vectors associated with respective images;

a temporary motion vector generator configured to generate temporary motion vectors for images in the image sequence based on stored reference data associated with a previous image in the image sequence, wherein the temporary motion vector generator is configured to generate k candidate vectors by adding, to a reference motion vector, respectively k search vectors and to determine an amplitude of a set of k search vectors by selecting a highest value from amongst a threshold amplitude, a horizontal component divided by two of a reference vector associated with a preceding image and a vertical component divided by two of the reference vector associated with the preceding image; and a motion vector verifier configured to:
determine whether temporary motion vectors generated by the temporary motion vector generator satisfy a reliability criteria, wherein the motion vector verifier is configured to determine that a generated temporary motion vector does not satisfy the reliability criteria when a magnitude of the generated temporary motion vector is less than a threshold value;

when the test unit determines the reliability criteria is satisfied by the generated temporary motion vector, storing the generated temporary motion vector in the memory as a reference vector associated with an image in the image sequence; and when the test unit determines the reliability criteria is not satisfied by the generated temporary motion vector, generate control signals to cause the temporary motion vector generator to generate a temporary motion vector for a subsequent image in the image sequence; and a video processor configured to generate video signals based on a set of temporary motion vectors, the set limited to temporary motion vectors satisfying the reliability criteria.

32. The system of claim 31 wherein the temporary motion vector generator comprises:

a candidate vector generator configured to generate a sequence of sets of a plurality of candidate vectors associated with respective images in the image sequence; and a motion vector selector configured to sequentially select a motion vector from the sets of candidate vectors according to a selection criteria, wherein the candidate vector generator is further configured to generate a subsequent set of candidate vectors based on a previously selected motion vector in the sequence of selected motion vectors.

33. The system of claim 31, further comprising:
an interface configured to receive the image sequence.

34. The system of claim 33, further comprising:
an image sensor communicatively coupled to the interface and configured to output the image sequence.

35. A system, comprising:

means for selecting images in a sequence of images captured by a sensor, the means for selecting including:

means for generating temporary motion vectors relating to current images as a function of reference data comprising a preceding image and a movement vector associated with the preceding image, the means for generating temporary motion vectors including means for determining an amplitude of a set of search vectors by selecting a highest value from amongst a threshold amplitude, a horizontal component divided by two of the movement vector associated with the preceding image and a vertical component divided by two of the movement vector associated with the preceding image;

means for determining whether temporary motion vectors satisfy a reliability criteria, wherein the reliability criteria is not satisfied when a magnitude of a respective temporary motion vector is less than a threshold value; and means for selecting images with related temporary motion vectors that satisfy the reliability criteria and associating the respective images with movement vectors based on the related temporary motion vectors; and means for generating video control signals based on a set of movement vectors, the set limited to movement vectors based on temporary motion vectors satisfying the reliability criteria.

36. The system of claim 35 wherein the means for generating temporary motion vectors comprises:

means for iteratively selecting a motion vector for an image in the image sequence from a sequence of sets of candidate vectors, wherein a first set of candidate vectors is generated by adding a set of search vectors to a movement vector associated with a previous image.

37. The system of claim 36 wherein the means for iteratively selecting a motion vector comprises:

a candidate vector generator; and
a motion vector selector.

38. The system of claim 36 wherein the means for iteratively selecting a motion vector is configured to employ two iterations to select the motion vector for an image and a set of candidate vectors in the sequence of sets of candidate vectors comprises four candidate vectors.

39. A non-transitory computer-readable memory medium containing instructions for causing a controller to process an image sequence by performing a method comprising:

selecting images in a sequence of images captured by a sensor, the selecting including:

determining a temporary motion vector relating to a current image as a function of reference data comprising a preceding image and a movement vector associated with the preceding image, wherein determining the temporary motion vector relating to the current image includes generating k candidate vectors by adding, to a reference motion vector, respectively k search vectors and determining an amplitude of the k search vectors by selecting a highest value from amongst a threshold amplitude, a horizontal component divided by two of the movement vector associated with the preceding image and a vertical component divided by two of the movement vector associated with the preceding image;

determining whether the temporary motion vector satisfies a reliability criteria;

when the temporary motion vector does not satisfy the reliability criteria, not selecting the current image; and when the temporary motion vector satisfies the reliability criteria, selecting the current image and associating a movement vector with the current image based on the temporary motion vector, wherein the reliability criteria is not satisfied when a magnitude of the temporary motion vector is less than a threshold value; and generating display control signals based on a set of temporary motion vectors limited to the temporary motion vectors satisfying the reliability criteria.

40. The non-transitory computer-readable memory medium of claim 39 wherein the selecting further includes:

when the temporary motion vector relating to the current image satisfies the reliability criteria, determining a temporary motion vector relating to a following image as a function of reference data corresponding to the current image; and when the temporary motion vector relating to the following image does not satisfy the reliability criterion, determining a temporary motion vector relating to a subsequent image, on the basis of the reference data corresponding to the current image.

41. The non-transitory computer-readable memory medium of claim 39 wherein determining the temporary motion vector relating to the current image comprises:

selecting a motion vector from among the k candidate vectors as a function of a selection rule; and repeating the generating and selecting of candidate vectors m times, the reference motion vector being for a first iteration of the generating k candidate vectors, an initial reference vector selected from among a set of vectors comprising at least one movement vector associated with a previous processed image and being for the repetitions of the generating k candidate vectors, the motion vector selected in the previous iteration, m being an integer greater than or equal to 1 and k being an integer greater than 1.

* * * * *